June 4, 1957 M. J. CONWAY 2,794,345
RATE GYROSCOPE
Filed July 21, 1955 3 Sheets-Sheet 1

INVENTOR.
MARTIN J. CONWAY
BY
Nicholas J. Garofalo
ATTORNEY

June 4, 1957 M. J. CONWAY 2,794,345
RATE GYROSCOPE

Filed July 21, 1955 3 Sheets-Sheet 3

INVENTOR.
MARTIN J. CONWAY
BY
Nicholas J. Garofalo
ATTORNEY

United States Patent Office 2,794,345
Patented June 4, 1957

2,794,345
RATE GYROSCOPE

Martin J. Conway, Packanack Lake, N. J., assignor to Bendix Aviation Corporation, Teterboro, N. J., a corporation of Delaware Application July 21, 1955, Serial No. 523,487

6 Claims. (Cl. 74—5.6)

This invention relates to new and useful improvements in rate gyroscopes, and an object of the invention is to provide a novel structure and general organization of parts in a rate gyroscope to effect an instrument of compact or bantam size.

A further object of the invention is to provide a compact rate gyroscope instrument having a gimbal of low frictional torque arrangement and a readily accessible pick-off mechanism.

A feature of the invention is the particular method of supporting the gimbal by pivot means at one end and crossed springs at the other to reduce the frictional torque of the gimbal support system.

Another feature of the invention is the particular arrangement of the pick-off system incorporated in the instrument, as a consequence of which, this mechanism is readily accessible for adjustment, replacement or other attention.

The invention further lies in its particular construction as well as in the general organization and cooperative association of its various parts.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

Figure 1:
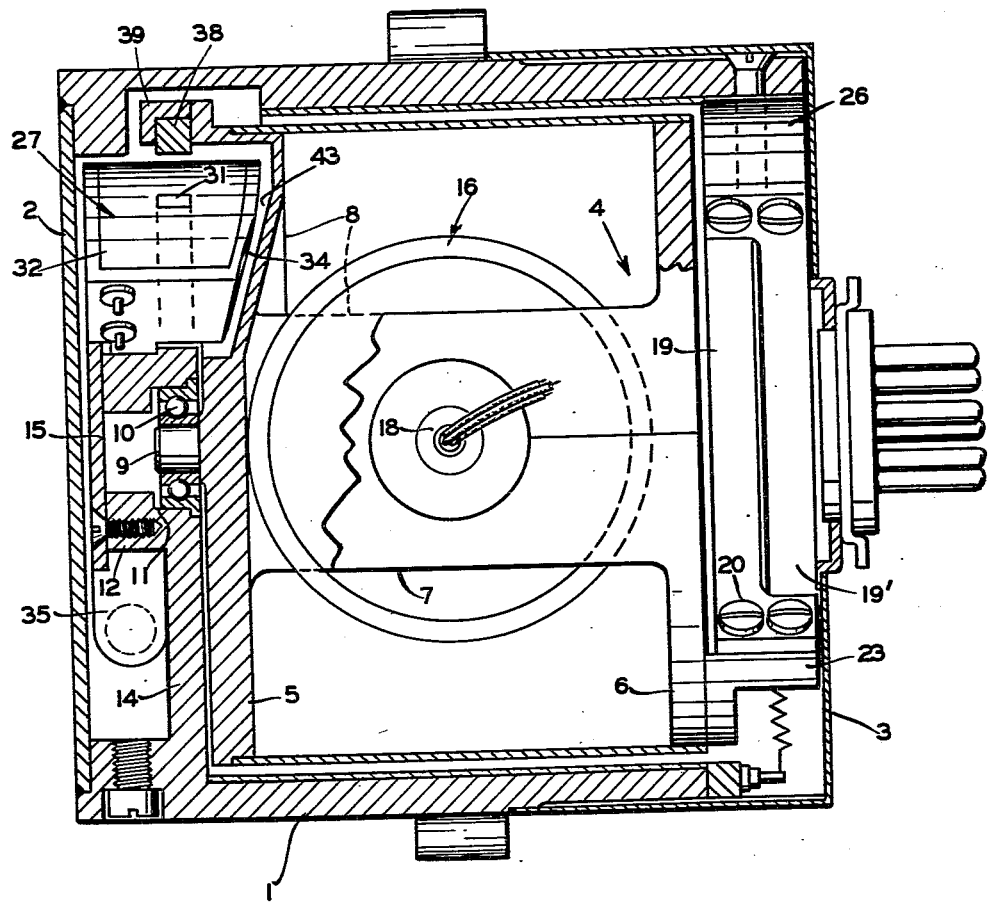
Fig. 1 is a longitudinal cross section through a rate gyroscope embodying the invention.
Figure 2:
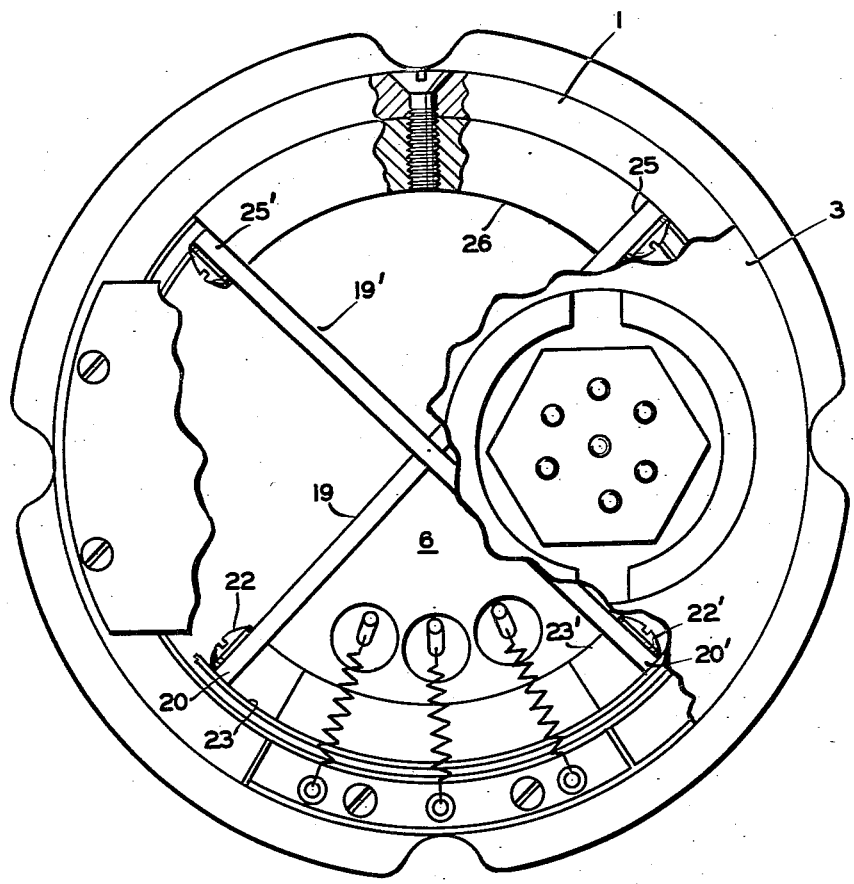
Fig. 2 is a right end view with parts cut away to better exhibit the crossed springs.
Figure 3:
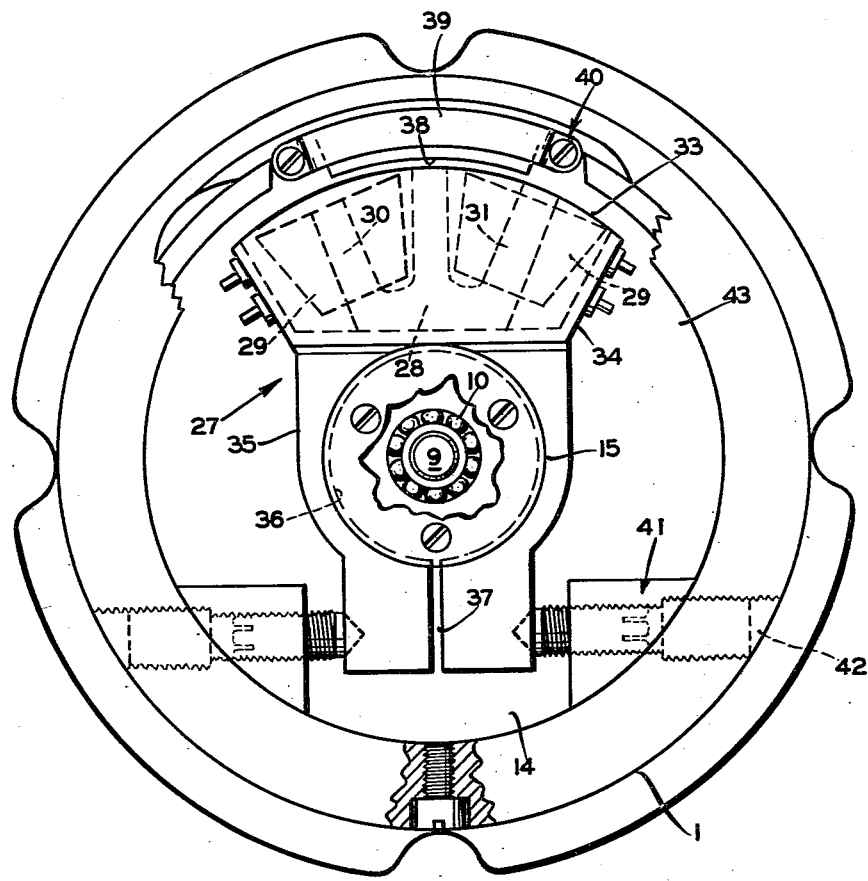
Fig. 3 is a view of the left end with the cover plate removed.

In describing the invention in further detail, reference is directed to the drawings wherein there is disclosed a rate gyroscope instrument having a cylindrical housing or framework 1, the open ends of which are sealed over, respectively, by covers 2 and 3. Supported within the framework of the housing is a gyro carrying gimbal 4. The gimbal comprises a pair of opposed circular end walls 5, 6, connected to one another by a pair of horizontally disposed parallel arms 7, 8. The left end wall 5 of the gimbal carries a pivot or trunnion 9 which is supported for rotation of the gimbal in a ball bearing 10. The latter is mounted in an axial opening 11 of a boss 12 formed in a wall 14 projecting upwards from the floor of the framework 1. The opening 11 is through the boss 12, and is closed over by a removable plate 15. The latter plate allows easy access for cleaning or other purpose to the gimbal pivot and bearing without having to remove the gimbal itself.

Disposed for rotation in the gimbal 4 is an electrically driven gyro generally indicated at 16. The spin axis 18 of the gyro is supported in suitable bearings in the opposed arms of the gimbal. The pivot or longitudinal axis of the gimbal is perpendicular to the spin axis of the gyro.

As previously stated, one end of the gimbal is supported by pivot and bearing means. The opposite end of the gimbal, however, is supported for oscillation by an adjacent pair of substantially coplanar crossed springs 19, 19', the center of the crossing point of which is on a line extension of the pivot axis of the gimbal. The springs are mounted at their lower ends 20 and 20' to lugs 23, 23', axially projecting from the lower portion of the end face of the right gimbal wall 6. The upper ends 25, 25' of the springs are bolted one to each end wall of a block 26 mounted to the ceiling of the housing 1. The spring arrangement provides a type of bearing for the gimbal which eliminates the frictional torques and substitute torques proportional to the angular deflection of the gimbal; while the ball bearing pivot at the opposite end of the gimbal provides only a low friction. The spring arrangement further tends to constantly dampen precession and to constantly restore the gimbal to normal position during precession. The extent of precession occurring is, because of this arrangement, relatively light.

A suitable pick-off assembly 27 is provided to transform the output of the instrument upon precession to an intelligible electrical signal. Here, the pick-off mechanism is located adjacent the pivot carrying wall 5 of the gimbal. The pick-off is of a differential transformer type having a three-legged laminated core 28 and suitable transformer coils 29 wound about each of the end legs 30, 31. The core and coils are contained in suitable insulating material 32 having an arcuate surface 33 to which the ends of the core legs extend. The latter structure is retained in a trough of a frame 34 having a depending stem body 35. The stem is adapted to be adjustably mounted on the cylindrical boss of the wall 14. To this end it carries a hole 36 sufficient to receive the boss. The hole 36 opens by a split 37 through the bottom end of the stem. The core is intended to have a fixed position relative to a wiping member 38. The latter has an arcuate wiping surface complementary to that of the pick-off mechanism.

The wiping element is held by a retaining plate 39 to the upper portion of the left end wall of the gimbal. Screw and slot means 40, securing the wiper assembly to the gimbal wall, permits adjustment of the gap between the wiper and the associated pick-up assembly.

The pick-up assembly is rotatable upon the boss as required to adjust or center its position relative to the overhanging wiper bar. Set screw means 41, associated with the split stem 35 and operable through openings 42 extending to the outside of the housing 1, permits centering of the pick-off member and fixing of its adjusted position. Because of the relative width of the pick-off frame 34 containing the core and coils, and because of its close proximity to the left gimbal wall, the upper portion of this gimbal wall is recessed as at 43 so as to freely accommodate the extended width of the pick-off frame 34 in that direction. This structure permits adjustment of the pick-off assembly without interference with the gimbal. It also allows for compactness of the overall assembly.

The advantage of the particular organization of the various parts of the instrument can now be appreciated. It can be seen that all that is required to give fully unimpeded access to the pick-off mechanism is to remove the cover plate. It can be further appreciated that if the crossed springs are duplicated at both sides of the gimbal, the particular accessible arrangement of the pick-off mechanism would not have been obtained, and further, the overall size of the instrument would consequently be required to be made larger.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is our intent, therefore, to claim the invention not only in the form shown and described, but also in all such forms and modifications as can reasonably be construed to fall within the spirit of the invention and the scope of the appended claims.

What is claimed is:

1. A gyroscope instrument having a housing, a gyro supporting gimbal, pivot and bearing means supporting the gimbal in the housing at one end; and crossed springs, affixed at one end to the housing and at the other end to the gimbal, so as to suspend the gimbal at its opposite end from within the housing.

2. A gyroscope instrument including a housing; a gyro supporting gimbal; a pick-off assembly including a transformer core having a fixed position within the housing, an armature movable relative to the transformer core and carried by the gimbal, pivot and bearing means supporting the gimbal at one end adjacent the pick-off assembly, and crossed spring means for suspending the gimbal at its opposite end from within the housing.

3. In a gyroscope of the character described including a gimbal, and pivot and bearing means supporting the gimbal at one end, a circular housing piece accommodating the pivot and bearing means, and a pick-off assembly comprising a transformer pick-off member adjustably mounted on the circular housing piece for angular adjustment thereon, a cooperating wiper element movable relative to the pick-off member and carried by the gimbal, and adjustable means accessible from the exterior of the housing to effect the angular adjustment of the transformer pick-off member on the circular housing piece.

4. In a gyroscope of the character described including a housing open at opposite ends, a gyro supporting gimbal within the housing, and crossed spring means bearing the gimbal at one end, a bossed housing piece adjacent the opposite end of the gimbal, a pick-off assembly frame mounted on the outer end of the bossed housing piece, and a pivot carried by the said opposite end of the gimbal carried in a bearing in the inner end of said bossed piece, and a removable cover plate over each of the open ends of the housing, one of said cover plates being adjacent the pick-up frame and the other cover plate adjacent the crossed spring means, whereby unimpeded access is provided to the pick-up frame and the crossed spring means upon removing the adjacent cover plate.

5. In a rate gyroscope of the character described including a housing having a bearing adjacent one end thereof, a rotor bearing gimbal within the housing, a pivot at one end of the gimbal rotatably supporting the gimbal in the housing bearing, and spring means for supporting an opposite end of the gimbal in said housing, said spring means including substantially coplanar crossed flat spring members fixed at one end to the housing and at the opposite end to the gimbal, the center point of said spring members being in line with the center line of the pivot axis, and said spring members yieldingly opposing precession of the gimbal in either direction from its neutral position.

6. In a rate gyroscope of the character described including a housing open at opposite ends and having a bossed housing piece adjacent one end thereof, a rotor bearing gimbal within the housing, a pivot member projecting from one end of the gimbal, a bearing within said bossed piece for carrying said pivot member, a transformer pick-off member adjustably mounted on said bossed piece for angular adjustment thereon, a cooperating wiper element movable relative to the pick-off member and carried by the gimbal, spring means for supporting an opposite end of the gimbal in said housing, said spring means including crossed flat spring members fixed at one end to the housing and at the opposite end to the gimbal, the center point of said spring members being in line with the center line of the pivot axis, and said spring members yieldingly opposing precession of the gimbal in either direction from its neutral position, a removable cover plate over each of the open ends of the housing, one of said cover plates being adjacent the pick-up member, the other cover plate adjacent the spring means, whereby unimpeded access is provided to the pick-up member and the spring means upon removal of the adjacent cover plate, and adjustable means accessible from the exterior of the housing to effect the angular adjustment of the transformer pick-off member on the bossed housing piece.

References Cited in the file of this patent

UNITED STATES PATENTS

| | | |
|---|---|---|
| 2,563,983 | Watson | Aug. 14, 1951 |
| 2,687,647 | Ashworth et al. | Aug. 31, 1954 |
| 2,712,757 | Schaberg | July 12, 1955 |
| 2,714,311 | Dobson | Aug. 2, 1955 |
| 2,735,731 | Freebairn | Feb. 21, 1956 |